US009525557B2

(12) United States Patent
Tanaka et al.

(10) Patent No.: US 9,525,557 B2
(45) Date of Patent: Dec. 20, 2016

(54) CERTIFICATE ISSUING SYSTEM, CLIENT TERMINAL, SERVER DEVICE, CERTIFICATE ACQUISITION METHOD, AND CERTIFICATE ISSUING METHOD

(71) Applicant: Panasonic Intellectual Property Management Co., Ltd., Osaka (JP)

(72) Inventors: Hiroyuki Tanaka, Fukuoka (JP); Saburo Toyonaga, Fukuoka (JP); Kenjiro Ike, Fukuoka (JP); Masakatsu Matsuo, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 35 days.

(21) Appl. No.: 14/711,676

(22) Filed: May 13, 2015

(65) Prior Publication Data

US 2015/0341178 A1 Nov. 26, 2015

(30) Foreign Application Priority Data

May 23, 2014 (JP) ................................. 2014-107296

(51) Int. Cl.
*H04L 29/06* (2006.01)
*H04L 9/32* (2006.01)
*H04L 9/08* (2006.01)

(52) U.S. Cl.
CPC .......... *H04L 9/3268* (2013.01); *H04L 9/0822* (2013.01); *H04L 9/0861* (2013.01); *H04L 9/0869* (2013.01); *H04L 9/32* (2013.01); *H04L 63/0823* (2013.01); *H04L 63/0876* (2013.01)

(58) Field of Classification Search
CPC ........................ H04L 63/0876; H04L 63/0823
See application file for complete search history.

(56) References Cited

U.S. PATENT DOCUMENTS 7,424,607 B2 * 9/2008 Kanda ................. H04L 63/1466
713/150
8,683,052 B1 * 3/2014 Brinskelle ........... H04L 63/0823
709/228
2004/0193889 A1 * 9/2004 Satake ................ H04L 63/0823
713/176

(Continued)

FOREIGN PATENT DOCUMENTS

| JP | 09-305661 A | 11/1997 |
| JP | 2009-260508 A | 11/2009 |
| JP | 4526809 B2 | 8/2010 |

*Primary Examiner* — Hadi Armouche
*Assistant Examiner* — Ali Shayanfar
(74) *Attorney, Agent, or Firm* — Seed IP Law Group LLP

(57) ABSTRACT

Provided is a certificate issuing system including a client terminal and a server device. The client terminal derives a first hash value from a first random number using a unidirectional function, generates a secret key and a public key of the client terminal, and transmits the first hash value and the public key of the client terminal to the server device. The server device receives the first hash value and the public key of the client terminal from the client terminal, stores the first hash value, authenticates the client terminal on the basis of the stored first hash value and the derived first hash value, generates a client certificate on the basis of the public key of the client terminal and a secret key of the server device when the authentication succeeds, and transmits the client certificate to the client terminal.

11 Claims, 5 Drawing Sheets

(56) References Cited

U.S. PATENT DOCUMENTS

| | | | |
|---|---|---|---|
| 2005/0138360 A1* | 6/2005 | Kamalakantha | G06F 21/606 713/156 |
| 2005/0188196 A1* | 8/2005 | Kakii | H04L 9/3263 713/156 |
| 2006/0031678 A1* | 2/2006 | Yasuhara | H04L 9/3247 713/176 |
| 2006/0048228 A1* | 3/2006 | Takemori | G06F 21/577 726/22 |
| 2008/0028443 A1* | 1/2008 | Adelman | G06Q 10/107 726/4 |
| 2008/0072052 A1* | 3/2008 | Suzuki | G06F 21/608 713/176 |
| 2009/0285389 A1* | 11/2009 | Matsuo | H04L 9/321 380/30 |
| 2010/0088507 A1* | 4/2010 | Cho | G06F 21/33 713/156 |

* cited by examiner

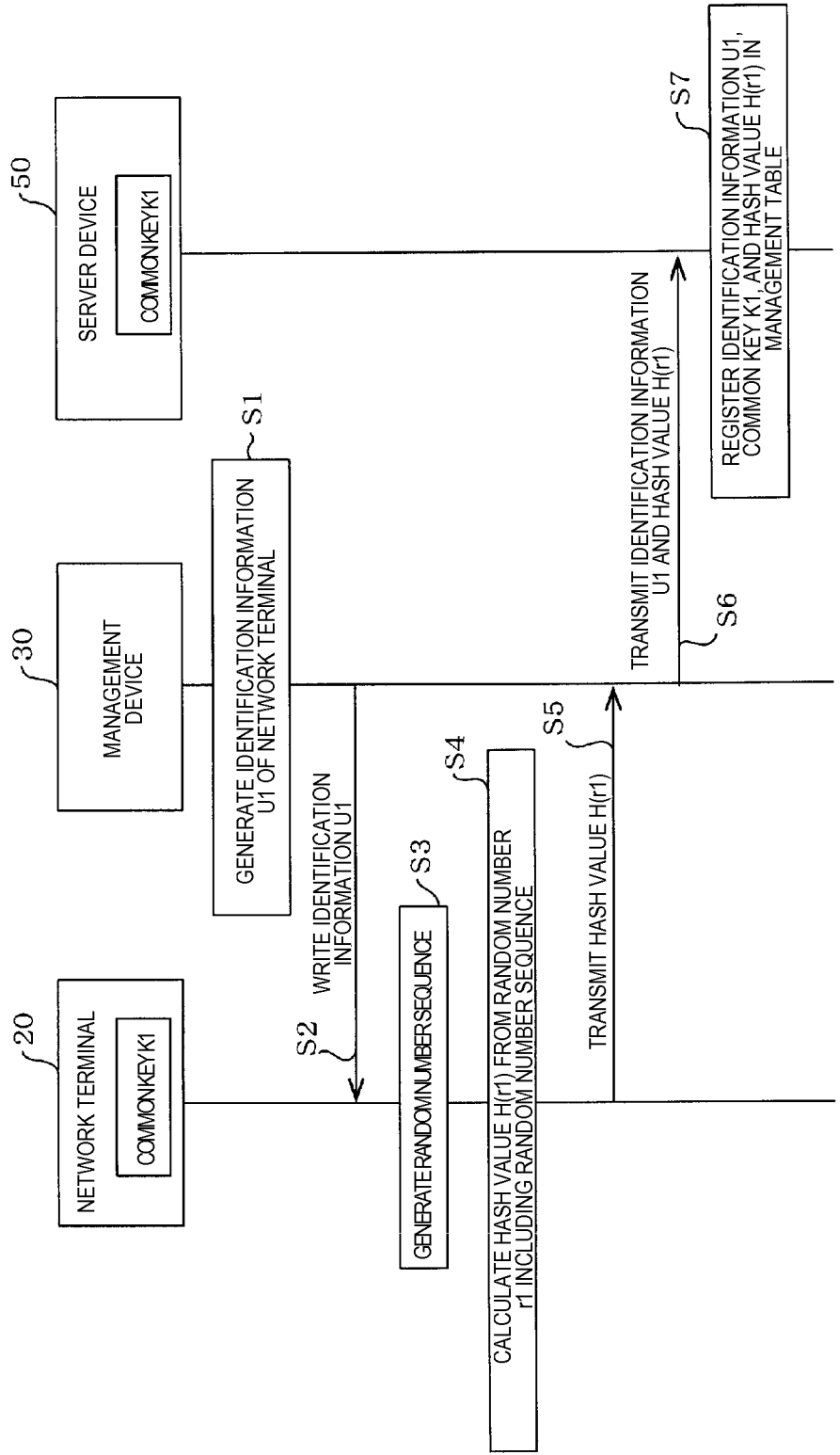

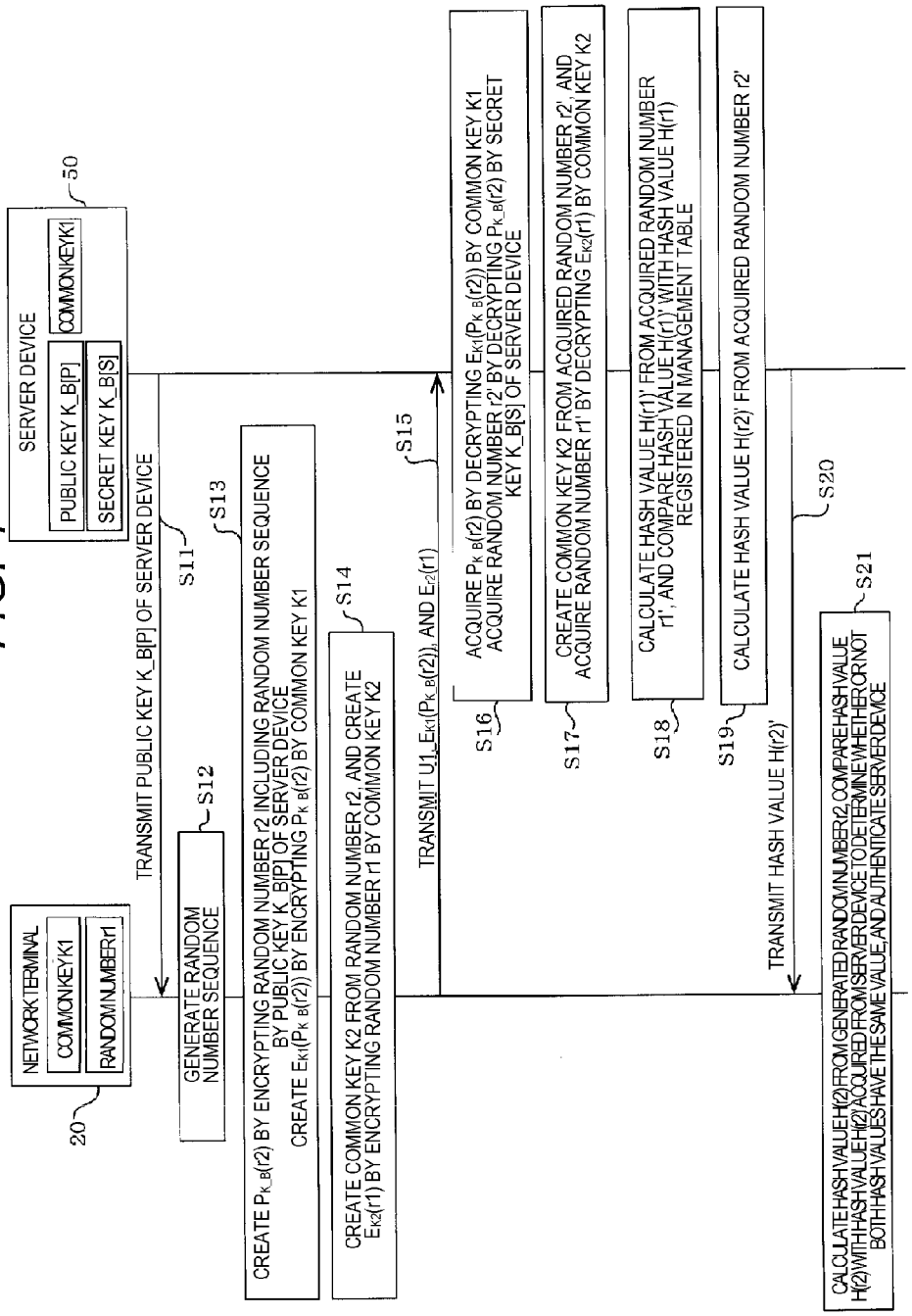

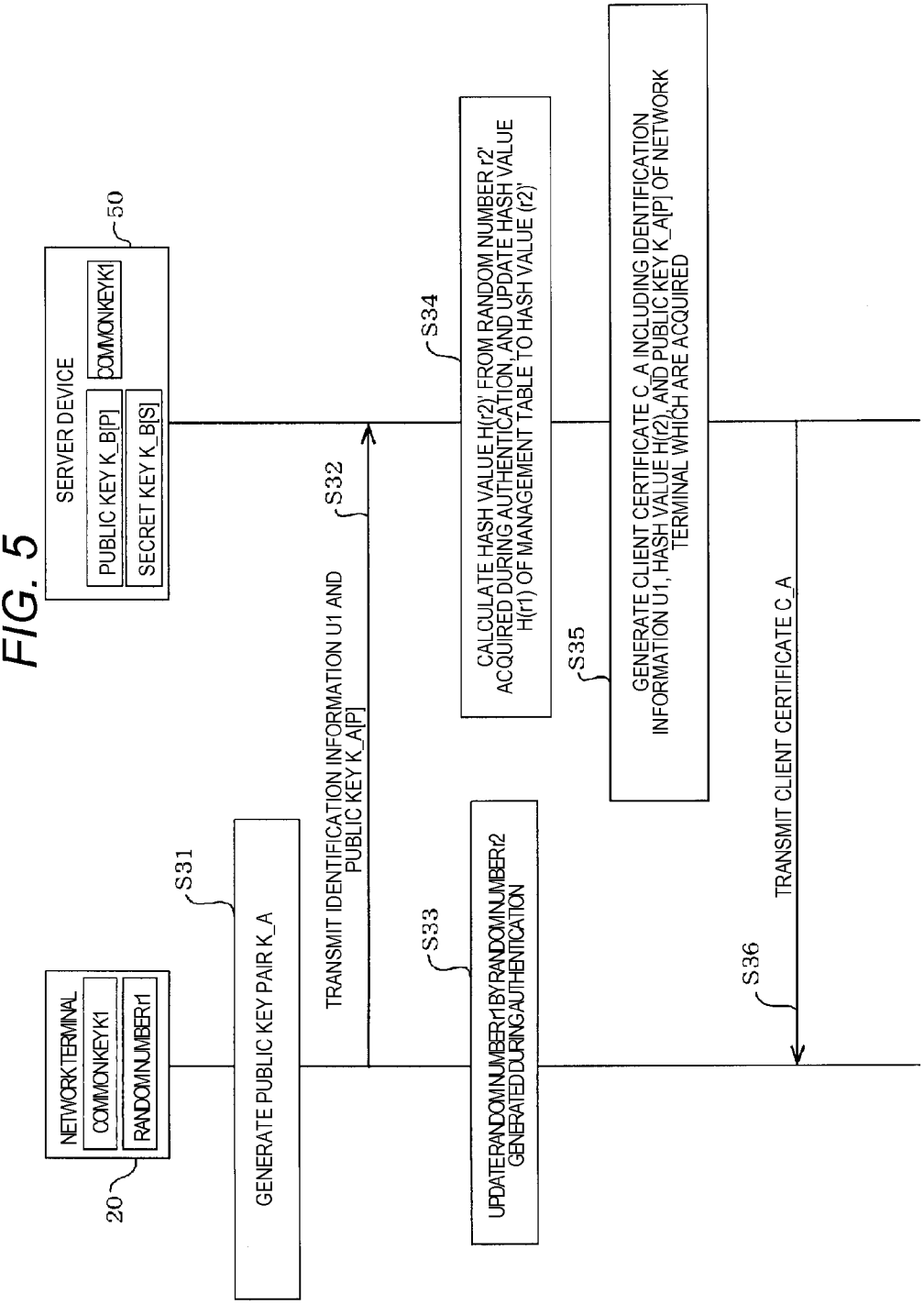

CERTIFICATE ISSUING SYSTEM, CLIENT TERMINAL, SERVER DEVICE, CERTIFICATE ACQUISITION METHOD, AND CERTIFICATE ISSUING METHOD

BACKGROUND OF THE INVENTION

1. Field of the Invention

The present invention relates to a certificate issuing system, a client terminal, a server device, a certificate acquisition method, and a certificate issuing method. For example, the present invention relates to a certificate issuing system that issues a client certificate to a client terminal, and the like.

2. Description of the Related Art

Hitherto, an authentication process using a digital certificate has been performed in order to increase safety in network communication. The digital certificate is issued by, for example, a certificate authority (CA).

As a certificate issuing system of the related art, there has been known a system in which a server device connected to a terminal through a network generates a public key pair (secret key and public key) and a client certificate of a client device (terminal) and writes the generated public key pair and client certificate in the terminal through a network (see Japanese Patent Unexamined Publication No. 2009-260508).

For example, in the system disclosed in Japanese Patent Unexamined Publication No. 2009-260508, the server device generates a secret key and signs a public key certificate for a public key of the client device (terminal) using the secret key of the server device to thereby create a certificate of the client device (client certificate). The system transmits the secret key of the client device which is encrypted by a password and the client certificate to the client device.

For example, Japanese Patent Unexamined Publication No. 9-305661 discloses a system that writes a certificate of a client device (terminal) (client certificate) during the manufacture of a terminal, as a certificate issuing system of the related art. In the system, a certificate management device generates a client certificate and a secret key during the manufacture of the terminal.

In the systems disclosed in Japanese Patent Unexamined Publication No. 2009-260508 and Japanese Patent Unexamined Publication No. 9-305661, it is difficult to reduce the risk of leakage of the secret key of the client terminal and to improve safety in issuing the client certificate.

SUMMARY OF THE INVENTION

The present invention is contrived in view of the above-mentioned situations, and an object thereof is to provide a certificate issuing system, a client terminal, a server device, a certificate acquisition method, and a certificate issuing method which are capable of reducing the risk of leakage of a secret key of a client terminal and improving safety in issuing a client certificate.

According to an aspect of the present invention, there is provided a certificate issuing system including a client terminal, and a server device that issues a client certificate to the client terminal. The client terminal and the server device are connected to each other through a network. The client terminal includes a random number generation unit that generates a first random number sequence, a first storage unit that stores a first random number including the first random number sequence, a first unidirectional function processing unit that derives a first hash value from the first random number using a unidirectional function, a data encryption unit that generates encrypted data using the first random number, a public key pair generation unit that generates a secret key and a public key of the client terminal, and a first communication unit that transmits the first hash value, the encrypted data, and the public key of the client terminal to the server device. The server device includes a second communication unit that receives the first hash value, the encrypted data, and the public key of the client terminal from the client terminal, a second storage unit that stores the first hash value, a data decryption unit that decrypts the encrypted data to thereby acquire the first random number, a second unidirectional function processing unit that derives a first hash value from the acquired first random number using a unidirectional function, a first authentication processing unit that authenticates the client terminal on the basis of the stored first hash value and the derived first hash value, and a certificate generation unit that generates a client certificate on the basis of the public key of the client terminal and a secret key of the server device when the authentication based on the first authentication processing unit succeeds. The second communication unit transmits the client certificate to the client terminal.

According to another aspect of the present invention, there is provided a client terminal which is connected to a server device through a network. The client terminal includes a random number generation unit that generates a random number sequence; a unidirectional function processing unit that derives a hash value from a random number including the random number sequence using a unidirectional function; a data encryption unit that generates encrypted data using the random number; a public key pair generation unit that generates a secret key and a public key of the client terminal; and a communication unit that transmits the hash value, the encrypted data, and the public key of the client terminal to the server device, and receives a client certificate based on the public key of the client terminal from the server device.

According to still another aspect of the present invention, there is provided a server device which is connected to a client terminal through a network. The server device includes a communication unit that receives a hash value derived from a random number, encrypted data generated using the random number, and a public key of the client terminal, from the client terminal; a storage unit that stores the hash value; a data decryption unit that decrypts the encrypted data to thereby acquire the random number; a unidirectional function processing unit that derives a hash value from the acquired random number using a unidirectional function; an authentication processing unit that authenticates the client terminal on the basis of the stored hash value and the derived hash value; and a certificate generation unit that generates a client certificate on the basis of the public key of the client terminal and a secret key of the server device when the authentication based on the authentication processing unit succeeds. The communication unit transmits the client certificate to the client terminal.

According to still another aspect of the present invention, there is provided a certificate acquisition method in a client terminal connected to a server device through a network. The certificate acquisition method includes a step of generating a random number sequence; a step of deriving a hash value from a random number including the random number sequence using a unidirectional function; a step of transmitting the hash value to the server device; a step of generating encrypted data using the random number; a step of generating a secret key and a public key of the client terminal; a step of transmitting the encrypted data and the public key of the client terminal to the server device; and a step of receiving a client certificate based on the public key of the client terminal from the server device.

According to still another aspect of the present invention, there is provided a certificate issuing method in a server device connected to a client terminal through a network. The certificate issuing method includes a step of receiving a hash value derived from a random number, from the client terminal; a step of storing the received hash value in a storage unit; a step of receiving encrypted data generated using the random number, from the client terminal; a step of decrypting the encrypted data to thereby acquire the random number; a step of deriving a hash value from the acquired random number using a unidirectional function; a step of authenticating the client terminal on the basis of the hash value stored in the storage unit and the derived hash value; a step of receiving a public key of the client terminal from the client terminal; a step of generating a client certificate on the basis of a public key of the client terminal and a secret key of the server device when the authentication succeeds; and a step of transmitting the client certificate to the client terminal.

According to the present invention, it is possible to reduce the risk of leakage of a secret key of a client terminal and to improve safety in issuing a client certificate.

BRIEF DESCRIPTION OF THE DRAWINGS

FIG. 3 is a sequence diagram illustrating an example of a registration sequence of a network terminal which is performed by the certificate issuing system according to the exemplary embodiment;

FIG. 4 is a sequence diagram illustrating an example of an authentication sequence of the network terminal and a server device which is performed by the certificate issuing system according to the exemplary embodiment; and FIG. 5 is a sequence diagram illustrating an example of an issuance sequence of a client certificate which is performed by the certificate issuing system according to the exemplary embodiment.

DETAILED DESCRIPTION OF THE PREFERRED EMBODIMENT

Figure 1:
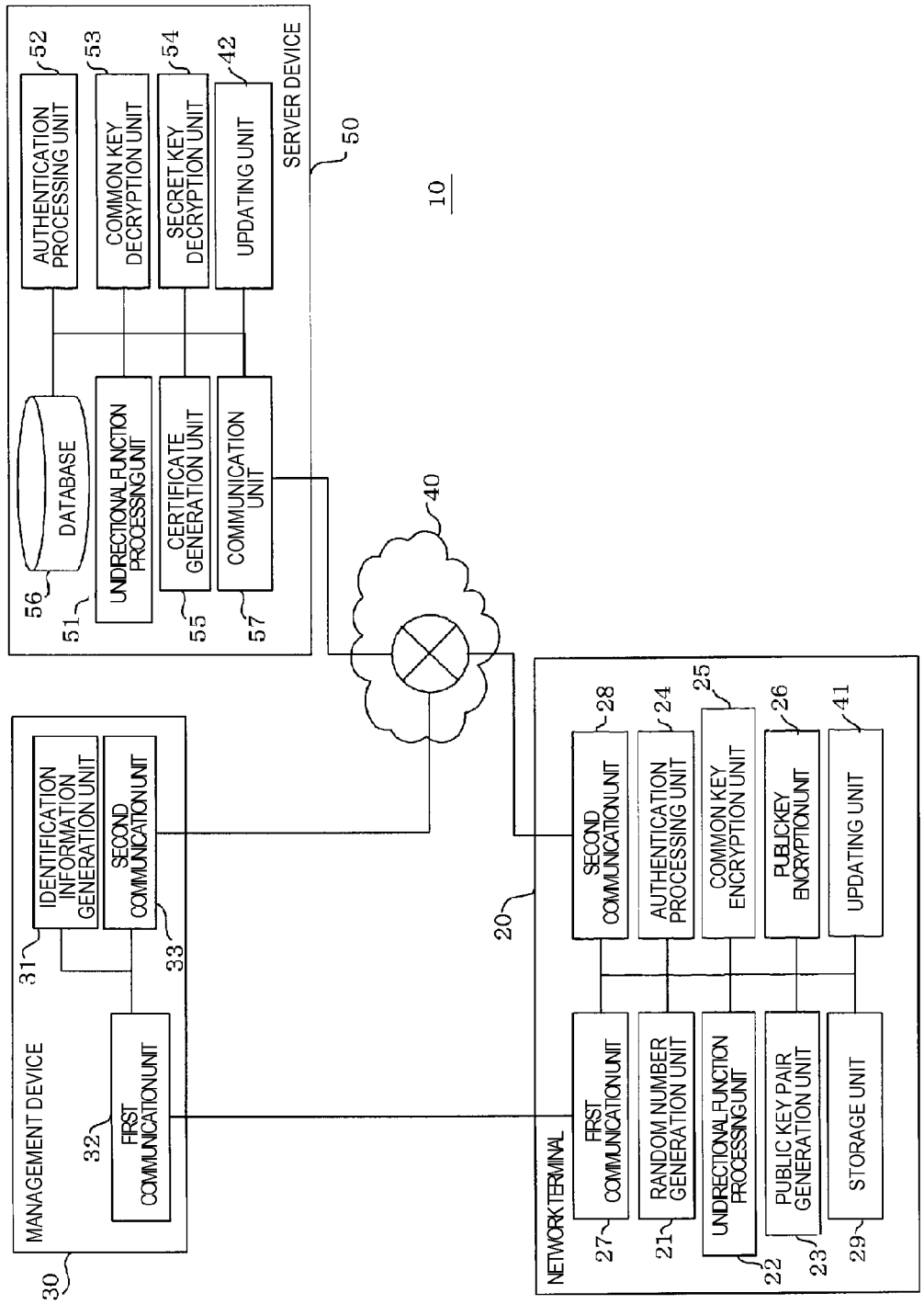
FIG. 1 is a block diagram illustrating a configuration example of a certificate issuing system according to an exemplary embodiment.

Hereinafter, an exemplary embodiment of the present invention will be described with reference to the accompanying drawings.
Background of Obtainment of Mode of the Present Invention In recent years, commodities and systems that provide added value by connecting, for example, a multifunction machine, a camera, or a smart appliance (appliance connected to a network) to a network are increasing in number with the development of the Internet. A terminal connected to a network is called a network terminal.

When a network terminal provides a service using the Internet, it is preferable to encrypt the communication of the network terminal and to strictly perform authentication in order to defend third party's unauthorized use and attack on a service.

In general, a cryptocommunication protocol is widely used as a technique for defending wiretapping, manipulation, or impersonation. The cryptocommunication protocol is, for example, secure sockets layer (SSL)/transport layer security (TLS) using public key infrastructure (PM). In the PKI, mutual devices connected to a network perform authentication using a digital certificate which is issued by a certificate authority (CA).

In the authentication using a digital certificate, a device (terminal) serving as an owner of the digital certificate owns a public key pair (public key and secret key) of the device. The secret key in the public key pair is required to be strictly managed so as not to be leaked to a third party. For this reason, the public key pair may be generated within the terminal serving as the owner of the public key pair, and a certificate authority may issue the public key and the digital certificate including owner information. In this case, it may take a long time to generate the public key pair of the device.

In the system disclosed in Japanese Patent Unexamined Publication No. 2009-260508, the server device generates the secret key and transmits the secret key to the client device, and thus there is a risk of the leakage of the secret key on the server device and a communication path. For this reason, it is necessary to strictly manage the server device and a server manager. When the server device and the server manager are not strictly managed, there is the possibility of the reliability of the client certificate being deteriorated.

In the system disclosed in Japanese Patent Unexamined Publication No. 9-305661, the certificate management device generates the secret key and writes the secret key in the terminal, and thus there is a risk of the leakage of the secret key during the manufacturing process. For this reason, it is necessary to strictly manage the manufacturing process. When the manufacturing process is not strictly managed, there is the possibility of the reliability of the client certificate being deteriorated.

Hereinafter, a description will be given of a certificate issuing system, a client terminal, a server device, a certificate acquisition method, and a certificate issuing method which are capable of reducing the risk of leakage of a secret key of a client terminal and improving safety in issuing a client certificate.

A certificate issuing system according to an exemplary embodiment to be described below is applied to, for example, a system in which a server device issues a client certificate to a network terminal.

Exemplary Embodiment

FIG. 1 is a block diagram illustrating a configuration example of certificate issuing system 10 according to an exemplary embodiment of the present invention. Certificate issuing system 10 includes network terminal 20, management device 30, and server device 50. Network terminal 20, management device 30, and server device 50 are connected to each other through Internet 40. Network terminal 20 is an example of a client terminal. Internet 40 is an example of a network.

Network terminal 20 is, for example, a camera, a multifunction machine, a television, a smartphone, or a tablet terminal which is connected to a network. Network terminal 20 includes random number generation unit 21, unidirectional function processing unit 22, public key pair generation unit 23, authentication processing unit 24, common key encryption unit 25, public key encryption unit 26, first communication unit 27, second communication unit 28, storage unit 29, and updating unit 41.

Random number generation unit 21 generates a random number sequence. Random number generation unit 21 may generate a pseudo-random number using, for example, a general pseudo-random number generation algorithm, or may generate a genuine random number using random number generation hardware.

Unidirectional function processing unit 22 generates a hash value from various pieces of data (for example, a random number including a random number sequence) using, for example, a unidirectional function.

Public key pair generation unit 23 generates a public key pair (a pair of a public key and a secret key) using, for example, a random number.

Authentication processing unit 24 authenticates server device 50 by comparing a hash value generated using a random number with a hash value transmitted from server device 50. The authentication is also referred to as server authentication.

Common key encryption unit 25 encrypts various pieces of data using a common key shared with server device 50. Public key encryption unit 26 encrypts data using, for example, the public key of server device 50. Common key encryption unit 25 and public key encryption unit 26 are examples of a data encryption unit.

First communication unit 27 is used in a manufacturing process of network terminal 20 and communicates with management device 30. First communication unit 27 includes, for example, a serial interface (I/F) or a communication interface. The serial I/F includes, for example, recommended standard 232 version C (RS-232C). The communication interface includes, for example, a universal serial bus (USB) or Thunderbolt (registered trademark).

Second communication unit 28 includes an interface that communicates with server device 50 through Internet 40. Second communication unit 28 includes, for example, a wired interface or a wireless interface. The wired interface includes, for example, a wired local area network (LAN) interface. The wireless interface includes, for example, Bluetooth (registered trademark) or a wireless LAN interface.

First communication unit 27 and second communication unit 28 are examples of a first communication unit that transmits data to management device 30 or server device 50.

Storage unit 29 stores various pieces of data. Storage unit 29 stores, for example, identification information, a shared key, a random number or a random number sequence of network terminal 20 at a predetermined timing. Storage unit 29 is an example of a first storage unit.

Updating unit 41 updates the various pieces of data (for example, a random number or a random number sequence) which are stored in storage unit 29. Updating unit 41 is an example of the first updating unit.

Network terminal 20 includes, for example, a central processing unit (CPU), a read only memory (ROM), and a random access memory (RAM). For example, the CPU realizes various types of functions in units within network terminal 20 by executing a program stored in the ROM.

Management device 30 generates identification information of network terminal 20. Management device 30 includes identification information generation unit 31, first communication unit 32, and second communication unit 33.

Identification information generation unit 31 generates identification information which is set in network terminal 20 in the manufacturing process of network terminal 20. The identification information includes, for example, a serial number of network terminal 20 and a media access control (MAC) address of network terminal 20. For example, it is possible to facilitate the management of the identification information by using the serial number and the MAC address. For example, the identification information which is set in network terminal 20 may be dynamically set. The identification information which is set in network terminal 20 is managed by, for example, a table, and the identification information within a predetermined range may be allocated to plurality of network terminals 20 in order.

First communication unit 32 is used in the manufacturing process of network terminal 20 and communicates with network terminal 20. First communication unit 32 includes, for example, a serial I/F or a communication interface. The serial I/F includes, for example, RS-232C. The communication interface includes, for example, a USB or Thunderbolt (registered trademark).

Second communication unit 33 includes an interface that communicates with server device 50 through Internet 40. Second communication unit 33 includes, for example, a wired interface or a wireless interface. The wired interface includes, for example, a wired LAN interface. The wireless interface includes, for example, Bluetooth (registered trademark) or a wireless LAN interface.

Management device 30 includes, for example, a CPU, a ROM, and a RAM. For example, the CPU realizes various types of functions in units within management device 30 by executing a program stored in the ROM.

Server device 50 stores, for example, a public key pair (public key and secret key) and a server certificate of server device 50 and issues a client certificate to network terminal 20. Server device 50 includes unidirectional function processing unit 51, authentication processing unit 52, common key decryption unit 53, secret key decryption unit 54, certificate generation unit 55, database 56, communication unit 57, and updating unit 42.

Unidirectional function processing unit 51 generates a hash value from various pieces of data (for example, a random number) using, for example, a unidirectional function. An algorithm of unidirectional function processing unit 51 is the same as, for example, an algorithm of unidirectional function processing unit 22 of network terminal 20.

Authentication processing unit 52 authenticates network terminal 20 by comparing a hash value obtained on the basis of data transmitted from network terminal 20 with a hash value registered in management table 63 to be described later. The authentication is also referred to as terminal authentication or client authentication.

Certificate generation unit 55 writes a signature using the secret key of server device 50 on the basis of, for example, the public key of network terminal 20 and the identification information of network terminal 20 to thereby generate a client certificate.

Common key decryption unit 53 decrypts encrypted data transmitted from network terminal 20 using a common key shared with network terminal 20. Secret key decryption unit 54 decrypts data (for example, a random number) which is encrypted using the public key of server device 50, using the secret key of server device 50. Common key decryption unit 53 and secret key decryption unit 54 are examples of a data decryption unit.

Database 56 stores various pieces of data. For example, database 56 stores the public key pair of server device 50, the server certificate, and the common key at a predetermined timing. Database 56 includes, for example, management table 63 (see FIG. 2B) which is used to authenticate network terminal 20. For example, management table 63 stores the identification information, the common key, and the hash value of network terminal 20 at a predetermined timing. Database 56 is an example of a second storage unit.

Communication unit 57 communicates with network terminal 20 through Internet 40. Communication unit 57 is an example of a second communication unit that receives data from a client terminal.

Updating unit 42 updates various pieces of data (for example, a hash value) which are stored in database 56. Updating unit 42 is an example of a second updating unit. Server device 50 includes, for example, a CPU, a ROM, and a RAM. For example, the CPU realizes various types of functions in units within server device 50 by executing a program stored in the ROM.

In FIG. 1, server device 50 and management device 30 are configured as separate devices, but may be configured as one device. Management device 30 and server device 50 are connected to each other by Internet 40, but may be connected to each other through, for example, a LAN.

Next, details of a random number and management table 63 will be described.

Figure 2A:
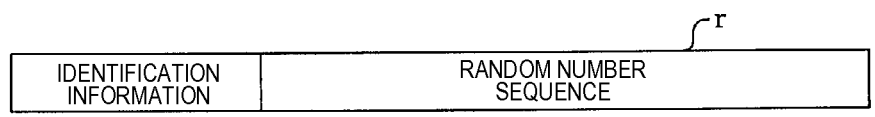
FIG. 2A is a schematic diagram illustrating a configuration example of a random number according to the exemplary embodiment.
Figure 2B:
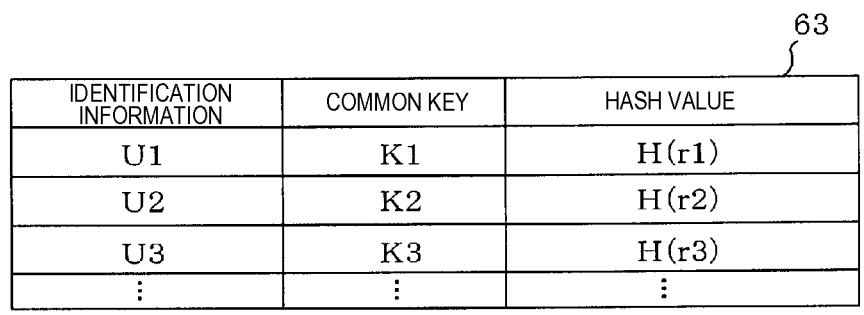
FIG. 2B is a schematic diagram illustrating an example of registered details of a management table according to the exemplary embodiment.

FIG. 2A is a schematic diagram illustrating a configuration example of random number r. FIG. 2B is a schematic diagram illustrating an example of registered details of management table 63.

As illustrated in FIG. 2A, for example, random number r may be a value obtained by combining a random number sequence generated by random number generation unit 21 within network terminal 20 with pieces of identification information of network terminal 20. In this case, the pieces of identification information (for example, a serial number and a MAC address) which are allocated to network terminal 20 are combined with the random number sequence so that random number r is set to a unique value, and thus it is possible to suppress the generation of the same random number r between network terminals 20. Therefore, for example, it is possible to suppress the deterioration in authentication accuracy of server authentication or client authentication.

The random number sequence is a random number sequence which is generated in network terminal 20.

It is preferable that random number r has a size equal to or greater than an output value of a unidirectional function which is used in the calculation of a hash value. For example, when SHA256 is used as the unidirectional function, it is preferable that the random number has a value equal to or greater than 32 bytes.

Random number r does not include the identification information of network terminal 20, and may be constituted by a random number sequence generated by random number generation unit 21.

As illustrated in FIG. 2B, in management table 63, a common key (K1, K2, K3, . . . ) and a hash value of random number r (r1, r2, r3, . . . ) are registered for each of the pieces of identification information (U1, U2, U3, . . . ) of network terminal 20.

The common key is a key which is used by server device 50 and each network terminal 20 in common and which is different for each network terminal 20. For example, the common key may be the same key for each type or each model of network terminal 20. The common key may be a value which is hard-coded in a program code.

Next, an example of the operation of certificate issuing system 10 will be described.

FIGS. 3 to 5 are sequence diagrams illustrating an example of the operation of certificate issuing system 10. First, the definition of signs used in FIGS. 3 to 5 will be described.

Signs r1 and r2 denote a random number. A random number sequence included in a random number includes, for example, a pseudo-random number and a genuine random number. For example, a general pseudo-random number generation algorithm or random number generation hardware may be used to generate a random number sequence. Federal information processing standardization (FIPS) 186-2 or national institute of standards and technology (NIST) special publication (SP) 800-90 may be used to generate a random number sequence. American national standards institute (ANSI) X9.31-1998 appendix C may be used to generate a random number sequence.

Signs K1 and K2 denote a common key. For example, when a common key is created from a random number, the common key may be created by adding up key lengths using a unidirectional function and a pseudo-random number generator. For example, the half of a random number which serves as a password and the remaining half thereof which serves as a salt may be input to PBKDF2 to thereby generate a common key. PBKDF2 denotes password-based key derivation function 2 (request for comments (RFC) 2898 public key cryptography standards (PKCS) #5 v2).

Sign K_A denotes a public key pair of terminal A. Terminal A is either network terminal 20 or server device 50. Sign K_A[P] denotes a public key in public key pair K_A of terminal A. Sign K_A[S] denotes a secret key in public key pair K_A of terminal A.

Sign EK1(M) denotes a result of the encryption of plaintext M using common key K1. For example, password-based encryption scheme (PBES)1 or PBES2 is used for the encryption.

Sign PK_A(M) denotes a result of the encryption of plaintext M using the public key of public key pair K_A. For example, a rivest shamir adelman (RSA) cryptogram, diffie-hellman (DH) key exchange, an elgamal cryptogram, or an elliptic curve cryptogram is used for the encryption.

Sign SK_A(M) denotes a result of the encryption of plaintext M using the secret key of public key pair K_A.

Sign H(M) denotes a hash value which is a result of the calculation of plaintext M using a unidirectional function. For example, message digest algorithm 5 (MD5), secure hash algorithm (SHA) 1, SHA256, or SHA512 may be used as the unidirectional function.

Sign C_A denotes a certificate (client certificate) of terminal A.

Sign U denotes identification information of a terminal. For example, a serial number of the terminal, a MAC address, a universally unique identifier (UUID), or an ID of a subscriber identity module (SIM) is used as the identification information. The terminal is either network terminal 20 or server device 50.

In the above description, signs used for device A have been illustrated. However, when signs are used for device B in the same manner, the portion "A" which is the above-mentioned sign is appropriately changed to "B".

FIG. 3 is a sequence diagram illustrating an example of a registration sequence of network terminal 20. The registration sequence is performed in the manufacturing process of network terminal 20. In FIG. 3, for example, network terminal 20 and server device 50 store common key K1 in advance.

In management device 30, identification information generation unit 31 generates identification information U1 of network terminal 20 (S1). First communication unit 32 transmits generated identification information U1 to network terminal 20 and writes the identification information in network terminal 20 (S2). In other words, in network terminal 20, first communication unit 27 receives identification information U1, and storage unit 29 stores identification information U1.

In network terminal 20, random number generation unit 21 generates a random number sequence (an example of first random number sequence) (S3). Unidirectional function processing unit 22 derives (for example, calculates) hash value H(r1) from random number r1 including the generated random number sequence (S4). Here, as described above, a value of a combination of the random number sequence and identification information U1 may be used as random number r1, or the random number sequence itself may be used as the random number. First communication unit 27 transmits calculated hash value H(r1) to management device 30 (S5).

In management device 30, when first communication unit 32 receives hash value H(r1), second communication unit 33 transmits identification information U1 and hash value H(r1) to server device 50 (S6). A secure communication path is established between management device 30 and server device 50, for example, by cryptographic communication based on an SSL or mutual authentication based on a certificate. A secure communication path other than an SSL may be established.

In server device 50, communication unit 57 receives identification information U1 and hash value H(r1) and registers identification information U1, common key K1, and hash value H(r1) in management table 63 which is stored in database 56 (S7). In this case, common key K1 and hash value H(r1) are registered in association with identification information U1, and thus the authentication of network terminal 20 based on server device 50 is facilitated.

According to the registration sequence illustrated in FIG. 3, in the manufacturing process, random number r1 is registered in network terminal 20, a hash value derived from random number r1 is registered in server device 50. Accordingly, in the step of the registration sequence, the secret key and the client certificate of network terminal 20 are not registered in network terminal 20. Accordingly, even when management in the manufacturing process is facilitated, for example, it is possible to reduce the leakage of the secret key or the client certificate of network terminal 20 and to improve the safety in the manufacturing process. Random number r1 can also be referred to as a secret key of network terminal 20.

Communication between network terminal 20 and management device 30 may be performed using a transmission control protocol (TCP)/internet protocol (IP) network. Communication between network terminal 20 and management device 30 may be performed through a dedicated communication interface (for example, a serial I/F) which is used to set network terminal 20 in the manufacturing process.

Identification information U1 may be information which is registered in management device 30 in advance, as a value based on the number of network terminals 20 manufactured. Identification information U1 includes, for example, a MAC address or a serial number which is allocated to network terminal 20 as described above, but may have another value as long as the value is unique.

Common key K1 may be generated by network terminal 20 and server device 50 on the basis of a key derivation function, or common key K1 may be hard-coded in a program code of network terminal 20. Management device 30 may set common key K1 in network terminal 20 and server device 50 in advance.

Management device 30 may transmit identification information U1 before transmitting hash value H(r1) to server device 50 in S6. For example, management device 30 may accumulate identification information U1 and hash value H(r1), and may transmit identification information U1 and hash value H(r1) to server device 50 at a timing when a manufacturing period or a manufacturing model is changed.

FIG. 4 is a sequence diagram illustrating an example of an authentication sequence of network terminal 20 and server device 50. In FIG. 4, cryptographic communication is performed between network terminal 20 and server device 50 on the basis of, for example, SSL/TLS. In the authentication sequence of FIG. 4, for example, an SSL handshake and a procedure of server authentication are omitted. The authentication sequence is performed after a registration sequence is terminated. In FIG. 4, it is assumed that device A is network terminal 20 and device B is server device 50.

When an authentication sequence is started, network terminal 20 stores common key K1 and random number r1 in, for example, storage unit 29. When the authentication sequence is stated, server device 50 stores common key K1, public key K_B[P], and secret key K_B[S] in, for example, database 56. Here, server device 50 is described as an example of terminal B. In other words, public key K_B[P] and secret key K_B[S] are a public key and a secret key of server device 50, respectively.

In server device 50, communication unit 57 transmits public key K_B[P] of server device 50 to network terminal 20 (S11).

In network terminal 20, second communication unit 28 receives public key K_B[P] of server device 50. Random number generation unit 21 generates a random number sequence (an example of a second random number sequence) (S12).

Public key encryption unit 26 encrypts random number r2 including a random number sequence using public key K_B[P] of server device 50 to thereby create encryption result PK_B(r2) (S13). Public key encryption unit 26 encrypts encryption result PK_B(r2) by common key K1 to thereby create encryption result EK1(PK_B(r2)) (S13). Encryption result PK_B(r2) and encryption result EK1 (PK_B(r2)) are examples of first encrypted data.

Common key encryption unit 25 creates common key K2 by random number r2, encrypts random number r1 by common key K2, and creates encryption result EK2(r1) (S14). In other words, here, random number r2 is used as a common key. Encryption result EK2(r1) is an example of second encrypted data.

Second communication unit 28 transmits identification information U1, encryption result EK1(PK_B(r2)), and encryption result EK2(r1) to server device 50 (S15).

In server device 50, communication unit 57 receives identification information U1, encryption result EK1(PK_B (r2)), and encryption result EK2(r1).

Common key decryption unit 53 acquires common key K1 associated with identification information U1 with reference to management table 63. Common key decryption unit 53 decrypts encryption result EK1(PK_B(r2)) by common key K1 to thereby acquire decryption result PK_B(r2) (S16).

Secret key decryption unit 54 decrypts decryption result PK_B(r2) using secret key K_B[S] of server device 50 to thereby acquire random number r2' as a decryption result (S16).

In order to indicate a value derived by server device 50 in distinction from a value which is stored or generated by network terminal 20, "'" is added to the value (for example, random number r2) (the same applies hereinafter).

Common key decryption unit 53 creates common key K2 by acquired random number r2', decrypts encryption result EK2(r1) by common key K2, and acquires random number r' as a decryption result (S17). In other words, here, random number r2' is used as a common key.

Unidirectional function processing unit 51 calculates hash value H(r1)' from acquired random number r1'. Authentication processing unit 52 acquires hash value H(r1) associated with identification information U1 with reference to management table 63. Authentication processing unit 52 compares calculated hash value H(r1)' with hash value H(r3) acquired from management table 63 to thereby authenticate network terminal 20 (S18). When both the hash values are the same as each other, authentication processing unit 52 determines that the authentication has succeeded. Thereby, it is possible to confirm the reliability of network terminal 20 and to further secure safety.

In server device 50, unidirectional function processing unit 51 calculates hash value H(r2)' from acquired random number r2' (S19).

Communication unit 57 transmits hash value H(r2)' to network terminal 20 through Internet 40 (S20).

In network terminal 20, second communication unit 28 receives hash value H(r2)'. Unidirectional function processing unit 22 calculates hash value H(r2) from random number r2 which is generated in S12. Authentication processing unit 24 compares calculated hash value H(r2) with hash value H(r2)' transmitted from server device 50 to thereby authenticate server device 50 (S21). When the both hash values are the same as each other, authentication processing unit 24 determines that the authentication has succeeded. Thereby, it is possible to confirm the reliability of server device 50 and to further secure safety. After an authentication sequence is performed, an issuance sequence of a client certificate is performed.

The processes of S19 to S21 may be omitted. In other words, processes related to server authentication based on random numbers r2 and r2' may be omitted. Server authentication may be performed using a method other than the process of S21.

According to the authentication sequence illustrated in FIG. 4, server device 50 can confirm the reliability of network terminal 20 and can issue a client certificate more safely by performing client authentication. Network terminal 20 can confirm the reliability of server device 50 and can acquire a client certificate more safely by performing server authentication.

In the authentication sequence, when a common key is used, it is possible to identify an intermediator between network terminal 20 and server device 50. For example, server device 50 can acquire random number r2' because the server device stores a common key, while the intermediator cannot acquire random number r2' because the intermediator does not store a common key. Accordingly, the intermediator cannot acquire hash value H(r1) of random number r1, and thus fails in client authentication. Therefore, it is possible to suppress the issuance of a client certificate to the intermediator from server device 50 and to suppress damage due to impersonation of an intermediator.

The public key of server device 50 may be a public key of a server certificate which is transmitted by a certificate message of SSL/TLS.

Network terminal 20 may store a route certificate of server device 50 which is acquired from a predetermined certificate authority other than server device 50, may compare the server certificate acquired from server device 50 with the route certificate, and may authenticate the server certificate. Thereby, it is possible to further improve the reliability of server device 50.

Random number r2 may be generated in advance or may be generated prior to S12. Thereby, for example, it is possible to shorten time required for an authentication sequence.

In S14, it is illustrated that random number r1 is encrypted by random number r2, but random number r2 may be encrypted by random number r1.

Identification information U1, encryption result EK1 (PK_B(r2)), and encryption result Er2(r1) which are transmitted in S15 may be transmitted separately.

Communication between network terminal 20 and server device 50 may be performed through a relay device (for example, a proxy server or a network address translation (NAT) router).

Hash value H(r2) may be generated in advance or may be generated prior to S21. Thereby, for example, it is possible to shorten time required for an authentication sequence.

FIG. 5 is a sequence diagram illustrating an example of an issuance sequence of a client certificate. When an issuance sequence of a client certificate is started, network terminal 20 stores common key K1 and random number r1 in, for example, storage unit 29. When an authentication sequence is started, server device 50 stores common key K1, public key K_B[P] and secret key K_B[S] in, for example, database 56. Here, server device 50 is described as an example of terminal B. In other words, public key K_B[P] and secret key K_B[S] are a public key and a secret key of server device 50, respectively. The issuance sequence of the client certificate is performed when server authentication succeeds or when server authentication and client authentication succeed. In FIG. 5, it is assumed that device A is network terminal 20 and device B is server device 50.

In network terminal 20, public key pair generation unit 23 generates public key pair K_A (S31). In other words, public key pair generation unit 23 generates public key K_A[P] and secret key K_A[S]. Here, network terminal 20 is described as an example of terminal A. In other words, public key K_A[P] and secret key K_A[S] are a public key and a secret key of network terminal 20, respectively. Public key K_A[P] and secret key K_A[S] which are generated are stored in, for example, storage unit 29.

Public key pair K_A may be generated in advance or may be generated prior to S31. In this case, even when it takes time to generate public key pair K_A, for example, it is possible to shorten a processing time required for the issuance sequence of the client certificate. A case where it takes time to generate public key pair K_A refers to, for example, a case where public key pair K_A is generated on the basis of a prime number.

Public key pair K_A is not generated in at least the manufacturing process of network terminal 20, and is generated after a hash value is transmitted to server device 50 from network terminal 20. Thereby, it is possible to prevent the secret key of network terminal 20 from being leaked in the manufacturing process.

Second communication unit 28 transmits identification information U1 and public key K_A[P] to server device 50 through Internet 40 (S32).

Updating unit 41 updates random number r1 by random number r2 generated in S12 (S33).

In server device 50, updating unit 42 updates hash value H(r1) which is registered in management table 63 by hash value H(r2)' which is calculated in S19 (S34). Certificate generation unit 55 generates client certificate C_A including identification information U1, hash value H(r2), and public key K_A[P] of network terminal 20 (S35). Certificate generation unit 55 signs client certificate C_A using secret key K_B[S] of server device 50. Hash value H(r2) is included in the client certificate, and thus it is possible to facilitate the confirmation of the validity of network terminal 20, for example, in communication using the client certificate.

Client certificate C_A may not include at least one of identification information U1 and hash value H(r2).

Communication unit 57 transmits generated client certificate C_A to network terminal 20 (S36). Thereby, network terminal 20 can acquire and use client certificate C_A.

The processes of S33 and S34 may be omitted. In this case, the hash value included in the client certificate serves as hash value H(r1).

According to the issuance sequence illustrated in FIG. 5, server device 50 can issue a client certificate to network terminal 20 when client authentication succeeds. In this case, it is possible to increase the possibility of a client certificate being issued to regular network terminal 20. Accordingly, it is possible to improve the reliability of the client certificate. Since the certificate is issued when the client authentication succeeds, it is possible to uniquely associate the client certificate with network terminal 20 as a client.

When server authentication succeeds, network terminal 20 can transmit the public key of network terminal 20 to server device 50. In this case, it is possible to increase the possibility of the public key of network terminal 20 being transmitted to regular server device 50. Accordingly, it is possible to prevent the public key from being provided to a server device as a malicious third party and to improve the reliability of a client certificate issued.

When a random number stored in network terminal 20 is updated whenever a client certificate is issued, it is possible to reduce the risk of leakage of the random number. The updating of the random number can allow network terminal 20 to store a new random number and can allow the effectiveness of the client certificate to be secured even when an expiration date is set in the random number and the client certificate.

When a hash value based on the random number stored in server device 50 is updated whenever a client certificate is issued, it is possible to reduce the risk of leakage of the hash value. The updating of the hash value can allow server device 50 to store a new hash value and can allow the effectiveness of the client certificate to be secured even when an expiration date is set in the hash value and the client certificate.

The client certificate is considered to be issued whenever the status of network terminal 20 is updated, for example, by a change in the owner of network terminal 20 or a change in a service provided to network terminal 20.

In FIG. 5, when the client certificate is issued to network terminal 20, network terminal 20 can safely communicate data through Internet 40 using a client certificate.

According to certificate issuing system 10, since the public key pair of network terminal 20 is generated by network terminal 20, it is possible to reduce the possibility of the secret key of network terminal 20 being leaked from a manager who manages management device 30 or server device 50.

Even when management device 30 or server device 50 is attacked, management device 30 or server device 50 does not store the secret key of network terminal 20, and thus it is possible to reduce the possibility of the secret key of network terminal 20 being leaked.

Since the secret key of network terminal 20 is not communicated through Internet 40, it is possible to reduce the possibility of the secret key of network terminal 20 being leaked during the communication through Internet 40.

Since a random number cannot be specified from a hash value in spite of the communication of the hash value through Internet 40, the confidentiality of the random number is ensured. Accordingly, even when the hash value is leaked, it is not possible to specify the random number from the hash value and to suppress the deterioration in the authentication accuracy of client authentication. Therefore, it is possible to maintain the reliability of a client certificate.

It is easy to generate a random number, and it is possible to generate a random number in a short period of time. Accordingly, it is possible to shorten time required to issue a certificate. Since the random number is not communicated to the outside from network terminal 20, the confidentiality of the random number is ensured. Therefore, the safety of the random number which is one secret key of network terminal 20 is secured, and thus it is possible to shorten time required to generate a secret key.

In the manufacturing process of network terminal 20, a secret key of network terminal 20 is not generated, and thus it is possible to reduce the possibility of a secret key of network terminal 20 being leaked from a manufacturer. Accordingly, it is possible to facilitate the management of a manufacturer for preventing a secret key of network terminal 20 from being leaked. For example, even when network terminal 20 is manufactured in overseas where it is difficult to perform strict management, it is possible to reduce the possibility of the secret key of network terminal 20 being leaked.

In the manufacturing process of network terminal 20, a client certificate is not registered in network terminal 20, and thus it is also possible to reduce the possibility of a client certificate being leaked from a manufacturer.

It is possible to reduce the possibility of a client certificate being issued to a malicious third party. For example, it is assumed that a third party attempts to commit an illegal action between network terminal 20 and server device 50 and acquires public key K_B(P) of server device 50. Even in this case, the third party does not hold common key K1, and thus cannot decrypt encryption result EK1(PK_B(r2)) in spite of the obtainment of the encryption result.

Even when the third party acquires common key K1, the third party does not hold secret key K_B(S) of server device 50, and thus it is not possible to decrypt random number r2. Random number r1 is encrypted by random number r2, and thus it is not possible to identify random number r2 in spite of the acquisition of encryption result Er2(r1) and it is not possible to obtain random number r1. In other words, random number r2 is used in addition to random number r1, and thus it is possible to further improve the authentication accuracy of client authentication.

Accordingly, when both common key K1 and secret key K_B(S) of server device 50 are not acquired, the third party cannot acquire random number r1. Therefore, it is possible to suppress an illegal action such as impersonation by a malicious third party.

In this manner, when the authentication of network terminal 20 succeeds, a public key in a public key pair of network terminal 20 which is generated within network terminal 20 is transmitted. Accordingly, it is possible to reduce the risk of leakage of a secret key of a client terminal and to improve safety in issuing a client certificate.

Although various embodiments have been described with reference to the drawings, it is needless to say that the present invention is not limited to such examples. It is obvious to those skilled in the art that various changed or modified examples can be made within the scope described in claims, and it is understood that these examples still fall within the technical scope of the present invention.

For example, random number r1 used for authentication and a random number used to generate a public key may have the same value or different values.

The present invention is useful for a certificate issuing system, a client terminal, a server device, a certificate acquisition method, a certificate issuing method, and the like which are capable of reducing the risk of leakage of a secret key of a client terminal and improving safety in issuing a client certificate.

What is claimed is:

1. A certificate issuing system comprising:
a client terminal; and
a server configured to issue a client certificate to the client terminal,
wherein the client terminal and the server are connectable to each other through a network,
wherein the client terminal includes
a random number generation processor configured to generate a first random number sequence and a second random number sequence,
a first storage configured to store a first random number including the first random number sequence,
a first unidirectional function processor configured to derive, using a unidirectional function, a first hash value from the first random number,
a data encryptor configured to generate first encrypted data based on a second random number including the second random number sequence and on a public key of the server and to generate second encrypted data based on the first random number and the second random number,
a public key pair generation processor configured to generate a secret key and a public key of the client terminal, and
a first communicator configured to transmit the first hash value, the first encrypted data, the second encrypted data, and the public key of the client terminal to the server, and to receive the public key of the server from the server,
wherein the server includes
a second communicator configured to receive the first hash value, the first encrypted data, the second encrypted data, and the public key of the client terminal from the client terminal and to transmit the public key of the server,
a second storage configured to store the first hash value,
a data decryptor configured to decrypt, using a secret key of the server, the first encrypted data to acquire the second random number and to decrypt, using the acquired second random number, the second encrypted data to acquire the first random number,
a second unidirectional function processor configured to derive, using the unidirectional function, a first derived hash value from the acquired first random number, a first authentication processor configured to authenticate the client terminal on the basis of the stored first hash value and the first derived hash value, and
a certificate generation processor configured to generate a client certificate on the basis of the public key of the client terminal and the secret key of the server when the first authentication processor authenticates the client terminal, and
wherein the second communicator is configured to transmit the client certificate to the client terminal.

2. The certificate issuing system of claim 1,
wherein the first storage is configured to store a common key which is shared by the client terminal and the server,
wherein the second storage is configured to store the common key,
wherein the data encryptor is configured to generate the first encrypted data based on the second random number, the public key of the server, and the common key, and
wherein the data decryption decryptor is configured to decrypt, using the common key and the secret key of the server, the first encrypted data to acquire the second random number.

3. The certificate issuing system of claim 1, wherein the first random number includes the first random number sequence and identification information of the client terminal, or the second random number includes the second random number sequence and identification information of the client terminal.

4. The certificate issuing system of claim 3, wherein the identification information of the client terminal includes a serial number or a MAC address of the client terminal.

5. The certificate issuing system of claim 1,
wherein the client terminal includes a first updating processor configured to update the first random number stored in the first storage based on the second random number when the first communicator transmits the public key of the client terminal,
wherein the second unidirectional function processor is configured to derive, using the unidirectional function, a second hash value from the second random number, and
wherein the server includes a second updating processor configured to update the first hash value stored in the second storage based on the second hash value when the second communicator receives the public key of the client terminal.

6. The certificate issuing system of claim 1, wherein the client certificate includes the first derived hash value derived by the second unidirectional function processor.

7. The certificate issuing system of claim 1,
wherein the second unidirectional function processor is configured to derive, using the unidirectional function, a second hash value from the second random number,
wherein the second communicator is configured to transmit the second hash value to the client terminal,
wherein the first communicator is configured to receive the second hash value from the server,
wherein the first unidirectional function processor is configured to derive, using the unidirectional function, a second derived hash value from the second random number,
wherein the client terminal includes a second authentication processor configured to authenticate the server on the basis of the received second hash value and the second derived hash value, and wherein the public key pair generation processor is configured to generate the secret key and the public key of the client terminal when the second authentication processor authenticates the server.

8. A client terminal connectable to a server through a network, the client terminal comprising:
a random number generation processor configured to generate a first random number sequence and a second random number sequence;
a unidirectional function processor configured to derive, using a unidirectional function, a hash value from a first random number including the first random number sequence;
a data encryptor configured to generate first encrypted data based on a second random number including the second random number sequence and on a public key of the server and to generate second encrypted data based on the first random number and the second random number;
a public key pair generation processor configured to generate a secret key and a public key of the client terminal; and
a communicator configured to transmit the hash value, the first encrypted data, the second encrypted data, and the public key of the client terminal to the server, and to receive the public key of the server and a client certificate from the server.

9. A server which is connectable to a client terminal through a network, the server comprising:
a communicator configured to transmit to the client terminal a public key of the server, and to receive from the client terminal a hash value derived from a first random number including a first random number sequence, first encrypted data generated based on a second random number including a second random number sequence and on the public key of the server, second encrypted data generated based on the first random number and the second random number, and a public key of the client terminal;
a storage configured to store the hash value;
a data decryptor configured decrypt, using a secret key of the server, the first encrypted data to acquire the second random number and to decrypt, using the acquired second random number, the second encrypted data to acquire the first random number;
a unidirectional function processor configured to derive, using a unidirectional function, a derived hash value from the acquired first random number;
an authentication processor configured to authenticate the client terminal on the basis of the stored hash value and the derived hash value; and
a certificate generation processor configured to generate a client certificate on the basis of the public key of the client terminal and the secret key of the server when the authentication processor authenticates the client terminal, wherein the communicator is configured to transmit the client certificate to the client terminal.

10. A certificate acquisition method executed in a client terminal connected to a server through a network, the certificate acquisition method comprising:
generating a first random number sequence and a second random number sequence;
deriving, using a unidirectional function, a hash value from a first random number including the first random number;
transmitting the hash value to the server device;
receiving a public key of the server from the server;
generating first encrypted data based on a second random number including the second random number sequence and on the public key of the server and to generate second encrypted data based on the first random number and the second random number;
generating a secret key and a public key of the client terminal;
transmitting the first encrypted data, the second encrypted data, and the public key of the client terminal to the server; and
receiving a client certificate from the server.

11. A certificate issuing method executed in a server device connected to a client terminal through a network, the certificate issuing method comprising:
transmitting to the client terminal a public key of the server;
receiving from the client terminal a hash value derived from a first random number including a first random number sequence;
storing the received hash value in a storage;
receiving from the client terminal first encrypted data generated based on a second random number including a second random number sequence and on the public key of the server;
receiving from the client terminal second encrypted data generated based on the first random number and the second random number;
receiving from the client terminal a public key of the client terminal;
decrypting, using a secret key of the server, the first encrypted data to acquire the second random number and decrypting, using the acquired second random number, the second encrypted data to acquire the first random number;
deriving, using a unidirectional function, a derived hash value from the acquired first random number;
authenticating the client terminal on the basis of the hash value stored in the storage and the derived hash value;
receiving a public key of the client terminal from the client terminal;
generating a client certificate on the basis of the public key of the client terminal and the secret key of the server when the client terminal is authenticated; and
transmitting the client certificate to the client terminal.

* * * * *